Patented Oct. 29, 1940

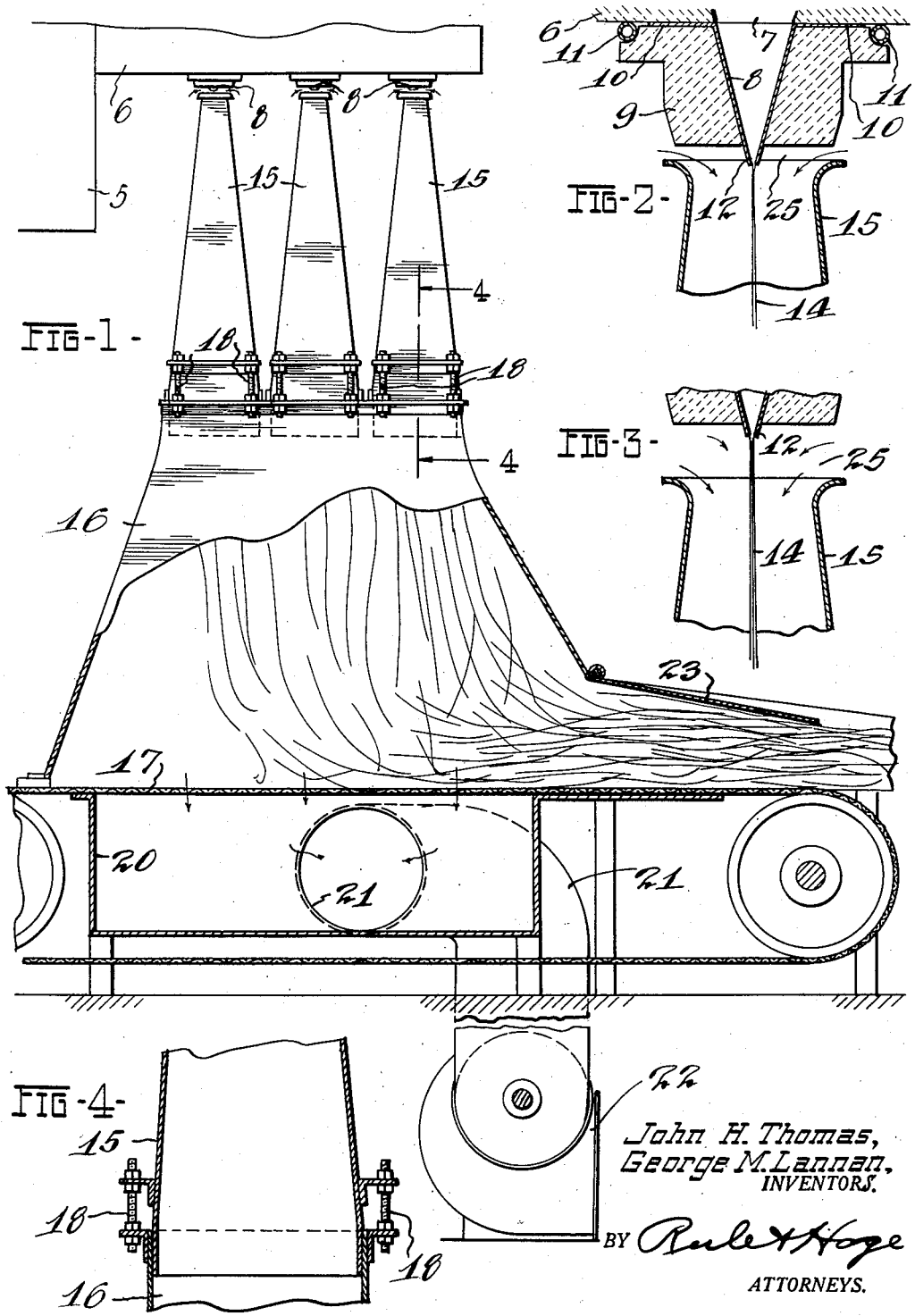

2,219,346

UNITED STATES PATENT OFFICE 2,219,346

METHOD AND APPARATUS FOR PRODUCING FIBROUS MATERIAL

John H. Thomas, Perrysburg, and George M. Lannan, Newark, Ohio, assignors, by mesne assignments, to Owens-Corning Fiberglas Corporation, a corporation of Delaware Application August 19, 1936, Serial No. 96,845
Renewed January 12, 1940

10 Claims. (Cl. 49—17)

The present invention relates to a novel method of producing long attenuated fibers and more particularly to an improved method and apparatus for causing a draft of gas to pull a stream of molten glass into long attenuated glass fibers.

Heretofore, in the manufacture of glass wool or fibers, it has been customary to flow glass downwardly in stream form through suitable openings and cause the stream to pass between or under the influence of pressure jets or blasts of gas, which impinge upon the streams and attenuate them into fibrous form. When the streams are whipped about by the blasts of gas during the cooling range, a relatively poor grade of glass fibers is produced owing to the fact that the fibers tend to be unduly bent as they are solidifying and taking final form.

In other methods of producing fibrous glass, a blast of gas is forcefully directed against a molten stream to disintegrate the stream into a mass of relatively short hairy fibers. These methods have various disadvantages, among them being a high consumption of attenuating gases and the shortness of the fibers produced.

The present invention aims to overcome the shortcomings noted hereinabove and to that end provides a method and apparatus for drawing fibers without the necessity of strong, positive pressure blasts of gases.

Another object of the invention is to provide a method and apparatus for treating a material which is capable of assuming a semi-fluid or viscous condition and gradually increasing in viscosity and hardening when passed in stream formation and cooled or attenuated, such materials including sugar, sealing wax, various other waxes, resin, rubber, or thermoplastic materials in general, and attenuating the same into fine long filaments.

Another object of the present invention is to provide a method and apparatus for producing glass wool or other fibrous material and mats thereof in an inexpensive, simple manner.

Other objects and advantages of the present invention will become apparent from the following description taken in conjunction with the drawing in which:

Fig. 1 is an elevational view, shown partly in section, of our improved apparatus for producing attenuated fibers and causing them to form into mats or felts;

Fig. 2 is a diagrammatical fragmentary view of a conventional bushing for emitting streams of molten glass or other material and means for causing an induction of gases at predetermined pressures around the attenuating streams;

Fig. 3 is a view similar to Fig. 2 showing the induction means in another position of adjustment; and Fig. 4 is a fragmentary sectional view of the hood shown in Fig. 1, the section being taken along the line 4—4 of Fig. 1.

The present invention contemplates the provision of a method and apparatus for treating various thermoplastic materials and other materials capable of assuming a semi-fluid or viscous condition and gradually increasing in viscosity and hardening when passed in stream formation and attenuated, such materials including glass, molasses, sugar, sealing wax and other waxes, resin, rubber, et cetera, said treatment contemplating emitting any of these materials in stream formation and then enveloping the stream in a smooth, regulable draft of gases at suitable temperature and pressure to attenuate and solidify the stream into fine, long filaments of many times smaller diameter than said stream. In the specific embodiment disclosed, we have illustrated a conventional glass furnace capable of producing streams of molten glass, but it is to be understood that other materials as mentioned herein-above are also adaptable and capable of being reduced to fine filaments with the same method and apparatus, varying only the temperatures and pressures as one skilled in the art would readily understand.

Referring more particularly to the drawing, reference character 5 designates a conventional glass furnace having a forehearth 6 extending therefrom, at the bottom of which are a plurality of discharge outlets 7. Underlying each outlet 7 is a conventional V-shaped bushing 8 which is preferably formed of platinum, or platinum alloy, and electrically heated, as illustrated and described more fully in the co-pending application for Letters Patent of Thomas and Fletcher, Serial No. 56,222, filed December 26, 1935, which issued as Patent No. 2,165,318, July 11, 1939. Surrounding the bushing 8 is a refractory supporting member 9 which is separated from the forehearth 6 by the marginal flange 10, formed integrally with the V-shaped bushing. Around the outer periphery of the flange 10 is a cooling means 11 adapted to freeze the glass in the vicinity of the outer edge of the marginal flange 10 and thus prevent leakage of glass from the bushing.

The bottom of the V-shaped bushing terminates in a plurality of nipple openings 12 which are relatively small and serve to emit a plurality of fine streams of molten glass 14. Spaced below the nipple openings 12 and the refractory supporting members 9 are confining hoods 15, into which the molten streams 14 are projected. The lower ends of the hoods 15 lead into a chamber 16 having at the bottom thereof a traveling foraminous belt 17 which is adapted to arrest the fibers in their downward passage. The hoods 15 are telescopically connected to the chamber 16 and are adjustably fastened thereto by screw bolts 18 or the like. This telescopic connection serves to permit the hoods 15 to be placed within a predetermined distance from the supporting members 9, the reasons therefor being more fully set out hereinafter.

Arranged beneath the belt 17 is a suction box 20 having a duct 21 leading to suitable suction producing means such as a blower or fan 22. At the front discharge end of the hood is an adjustable apron 23 which overlies the mat of glass wool fibers which is being conveyed out of the chamber by the belt 17. The apron 23 serves to sustain the vacuum caused by the fan 22 within the chamber 16.

The operation of our device contemplates maintaining a constant level of molten glass within the furnace 5 and the forehearth 6 over the bushings 8. The temperature of this glass may be within optional limits according to the nature of the glass and the type of glass wool which is to be produced. We have found relatively high temperatures of about 2000° to 2300° F. satisfactory, although, of course, these may be varied to suit particular conditions. The electrically heated bushings 8 serve to maintain the glass within the narrow limits of temperature which are desired, and cause the glass to flow from the nipple openings in fine stream. The diameters of the nipple openings are relatively small, the exact size, of course, being determined by the particular type and grade of wool which is to be produced. As an example, it is possible to provide nipple openings from about .125 inch to .150 inch for the production of filter wool, which is relatively coarse, having diameters within a range of about .005 inch to .013 inch. For finer types of wool ranging in diameter size from .0001 inch to .0005 inch, smaller nipple openings are preferable, the diameters of the openings being about in a range of .040 inch to .060 inch.

As the molten streams 14 immerge into the hoods 15, they are enveloped in relatively cool drafts of induced gases which are admitted through the intervening spaces or slots 25 between the upper edges of the hoods 15 and the supporting members 9. The sub-atmospheric pressure in the suction box 20 causes a partial vacuum to exist throughout the chamber 16 and the hoods 15. This vacuum serves to increase the rate of discharge of the glass streams from the nipple openings 12.

We have found it possible to regulate the rate of production of the glass wool and the degree of attenuation of the fibers by regulating the size of the slots 25 and the degree of vacuum in the suction box. As shown in Fig. 2, the hood 15 has been raised to within a short distance as, for example, within a fraction of an inch of the supporting members 9. This causes a higher degree of vacuum to exist in the hoods 15 and also causes a concentration of the draft between the hood and the refractory bushing whereby the glass fibers are attenuated at a higher rate and to a greater degree than when the width of the passageways 25 is increased. In Fig. 3 the hood 15 has been shown somewhat lower in position whereby the slot 25 has been increased to admit a larger amount of draft.

It will be noted that the present invention provides a method of inducing a smooth flow of air around the fibers and at the same time causing a high degree of vacuum to exist below the nipple openings, into which the glass streams are discharged. The draft of gas induced through the slots 25 envelopes the streams of glass during this period and cools the glass and thus causes said streams to freeze into fibers before they have had an opportunity to attenuate to too high a degree. It will also be noted that the induced gases are the coolest at the point where the glass is the hottest, that is, at the nipple openings. This causes the glass to be rapidly cooled and permits the glass to be attenuated within a small range. The entire attenuation, however, may be effected prior to chilling of the fibers to solidity. The high temperature of the glass in the bushings permits it to flow continually even though an end may perchance break.

The fibers are carried downwardly through the hoods 15 and chambers 16 by the enveloping draft and are forcefully disposed upon the belt 17. The suction within the box causes the fibers to impinge upon and be held against the belt, and thereby facilitates intertwining and felting of the fibers. As the belt travels to the discharge end of the hood, a felted mass is gradually built up until it is completed at the discharge end of the hood.

Modifications may be resorted to within the spirit and scope of the appended claims.

We claim:

1. The method of producing fibrous glass which consists in establishing a supply body of molten glass, projecting from said supply body a stream of said glass in a semi-fluid or plastic condition, reducing the pressure below said point of projection and around said stream to sub-atmospheric pressure and thereby causing the enveloping gases surrounding said stream to flow concurrently with said stream and to draw it continuously to a single attenuated filament of a diameter smaller than said stream, and maintaining said sub-atmospheric pressure around said stream until it is completely hardened.

2. The method of producing fibrous glass which consists in establishing a supply body of molten glass, projecting from said supply body a stream of said glass in a semi-fluid or plastic condition, reducing the pressure below said point of projection and around said stream to sub-atmospheric pressure and thereby causing the enveloping gasses surrounding said stream to flow concurrently with said stream and to draw it continuously to a single attenuated filament of a diameter smaller than said stream, said stream being projected into a region of pressure less than atmospheric, and said induced gases being caused to flow at said reduced pressure, and maintaining said sub-atmospheric pressure around said stream until it is completely hardened.

3. The method of producing fibrous glass which consists in establishing a supply body of molten glass, projecting from said supply body a stream of said glass in a semi-fluid or plastic condition, inducing surrounding atmospheric gases to impinge upon and to flow concurrently with said stream and attenuate said stream to an attenuated filament of smaller diameter than said stream, said stream being projected into a region of pressure less than atmospheric, and said induced gases being caused to flow at said subatmospheric pressure, and maintaining said subatmospheric pressure around said stream until it is completely hardened.

4. The method which comprises flowing a stream of viscous glass, inducing a draft of gas by suction and causing it to envelop said stream and apply to the stream a pulling force due to the kinetic energy of said draft, of sufficient intensity to attenuate and draw the material into fine fibrous form, and maintaining said suction and resulting pulling force around said stream until it is completely hardened and attenuated.

5. Apparatus for producing fibrous glass which comprises a container for molten glass having openings in the bottom thereof adapted to emit a multiplicity of closely spaced streams of molten glass, a streamline conduit closely spaced around and along the path of said streams having an opening spaced apart from said container into which said streams are admitted, means for exhausting the gases in said conduit and producing a vacuum therein and causing surrounding atmospheric air to flow into the opening of said conduit and impinge upon said streams and flow concurrently therewith to cause them to be attenuated into filaments, the said exhausting means being sufficiently remote from said container that the said vacuum is maintained around and along the length of said streams until they are completely hardened.

6. Apparatus for producing fibrous glass which comprises a container for molten glass having openings in the bottom thereof adapted to emit a multiplicity of closely spaced streams of molten glass, a streamline conduit closely spaced around and along the path of said streams having an opening spaced apart from said container into which said streams are admitted, means for exhausting the gases in said conduit and producing a vacuum therein to cause surrounding atmospheric air to flow into the opening of said conduit and impinge upon said streams and flow concurrently therewith to cause them to be attenuated into filaments, the said exhausting means being sufficiently remote from said container that the vacuum is maintained around and along the length of said streams until they are completely hardened, and a foraminous belt in said conduit upon which said attenuated filaments are arrested and intermatted to form a felted mass.

7. Apparatus for producing fibrous glass which consists in a bushing having openings in the bottom thereof adapted to emit streams of glass, a streamline conduit having the walls thereof closely spaced around and along the path of said streams and having an opening spaced apart from said bushing into which said streams are admitted, a foraminous belt mounted in said conduit remote from said opening, means for exhausting the gases under said belt and in said conduit and causing surrounding atmospheric air to be induced into the opening in said conduit at sub-atmospheric pressure and impinge against said streams and flow concurrently therewith at a velocity greater than said streams to cause said streams to be attenuated and cooled into fibrous form having diameters less than that of said streams, and then cause said induced air to convey said fibers onto said belt while maintaining said sub-atmospheric pressure around said streams until they are attenuated and hardened and deposited upon said belt.

8. The method which comprises flowing a stream of viscous glass, inducing by suction through an open ended tube defining a column of moving gases a draft of gas at subatmospheric pressure and of sufficient force and intensity to draw and attenuate said stream to fine fibrous form, introducing said stream into said draft and causing said stream to be attenuated by the kinetic energy and force of said draft to fine fibrous form, and maintaining said subatmospheric pressure around said stream until it is completely hardened.

9. The method which comprises exhausting air from an open ended tube defining a column of moving gases and thereby inducing an indraft of atmospheric air into said tube space through an opening communicating with the atmosphere, introducing a stream of viscous glass through said opening into said indraft of air and causing the stream of material to be attenuated to a relatively fine filamentary form by the kinetic energy and force of said induced draft of air, and maintaining subatmospheric pressure around said stream until it is completely hardened.

10. The method which comprises flowing a stream of viscous glass from a molten supply body having an outlet orifice, inducing a column having greater length than width of moving gases by suction from a point remote from said outlet orifice and causing said column to envelop at subatmospheric pressure said stream from a point substantially at the outlet end of said outlet orifice and flow in the same direction as said stream and apply to the stream a pulling force due to the kinetic energy of said column of sufficient intensity to draw and attenuate the material into fine fibrous form, and maintaining said subatmospheric pressure and resulting pulling force around said stream until it is completely hardened and attenuated.

JOHN H. THOMAS.
GEORGE M. LANNAN.